United States Patent [19]

Sichler

[11] Patent Number: 4,649,641

[45] Date of Patent: Mar. 17, 1987

[54] CONNECTOR FITTING WITH AN ELECTRICAL HEATING WIRE

[76] Inventor: Wolfgang Sichler, Sinsheimer Str. 20, D-6800 Mannheim 61, Fed. Rep. of Germany

[21] Appl. No.: 771,823

[22] Filed: Sep. 3, 1985

Related U.S. Application Data

[62] Division of Ser. No. 463,514, Feb. 3, 1983, Pat. No. 4,555,834.

[30] Foreign Application Priority Data

Feb. 11, 1982 [DE] Fed. Rep. of Germany ....... 3204681

[51] Int. Cl.⁴ .............................................. H05B 3/58
[52] U.S. Cl. ...................... 29/611; 219/535; 219/542; 219/544; 285/22
[58] Field of Search ............ 219/544, 535, 522, 542; 29/611, 456, 33 T; 285/260, 463, 22

[56] References Cited

U.S. PATENT DOCUMENTS

| | | | |
|---|---|---|---|
| 3,943,334 | 3/1976 | Sturm | 219/544 |
| 4,147,926 | 4/1979 | Stähli | 219/544 X |
| 4,176,274 | 11/1979 | Lippera | 219/544 |
| 4,470,193 | 3/1982 | Karel | 29/611 |

FOREIGN PATENT DOCUMENTS

| | | | |
|---|---|---|---|
| 0035750 | 9/1981 | European Pat. Off. | 29/33 R |
| 2823455 | 12/1978 | Fed. Rep. of Germany | 29/33 R |
| 7901018 | 11/1979 | PCT Int'l Appl. | 219/544 |
| 257226 | 3/1981 | Spain | 29/33 R |

OTHER PUBLICATIONS

Electric Weld Fittings—Brochure of Friedrichfeld Co. (translation of pp. 1, 2 and 3).

*Primary Examiner*—William R. Briggs
*Attorney, Agent, or Firm*—Price, Heneveld, Cooper, DeWitt & Litton

[57] ABSTRACT

A connector fitting in the form of a sleeve for use on synthetic resin pipes has heating wire let into its inner face for heating the sleeve material and the ends of the pipes to be joined so that a fusion weld is produced. In order to have the wire so fixed in place that on the one hand there is no danger is its being pushed out of place when the pipes are slipped into the fitting, while on the other hand taking care of inaccuracies in the size of the pipes, the wire is let into a cut or groove, that has been opened up, in the fitting and the edges of the cut are overlapped onto the wire so that it is well locked in place.

9 Claims, 5 Drawing Figures

CONNECTOR FITTING WITH AN ELECTRICAL HEATING WIRE

This is a division of application Ser. No. 463,514, filed Feb. 3, 1983, now U.S. Pat. No. 4,555,834.

BACKGROUND OF THE INVENTION

The present invention is with respect to electrical welding connectors and more specially to such connectors in the form of a tube-like, synthetic resin fitting to be placed on synthetic resin parts that are to be joined together, the connector having on faces thereof, that are to be seated against the parts to be joined, an electrical heating wire let into the resin of the connector, ends of the wire being placed for connection with an electrical power supply.

The invention further has to do with a process for producing such a connector designed for electrical welding and with an apparatus for producing the connectors.

ACCOUNT OF THE PRIOR ART

A number of different forms of electrical welding fittings made of hard polyethylene have been made public in the form a a catalog of the company Friedrichsfeld GmbH Steinzeug und Kunststoffwerke, 6800 Mannheim 71. Such fittings, based on the use of electrical welding using a heating wire coil, had the coil let into an inner face of the fitting while the ends of the wire coil were joined with electrical connection bushes so that when the ends had been joined up with a power supply the wire might be heated by resistance heating. Placing the wire coil right up against the face of the pipe to be joined made it possible to get the best possible heat transfer and heat conduction all the time that welding took place so that the fitting became strongly and permanently welded to the pipe in a very short time, the join furthermore taking up little space. The wire was firmly fixed in the polyethylene so as to give a reinforcing effect acting against the pressure in the pipe in later use thereof. The catalog was with respect to fittings in the form of sleeves, reducing sleeves, end caps, elbows, T-pieces, patches, and patches for making a drilled connection under pressure or not under pressure, all such fittings have heating wires let into the face of the fitting which was to be joined with the pipe or the like.

The European patent application No. 003575 is with respect to welding connectors for synthetic resin piping in the form of a sleeve that is slipped over the ends of the pipes to be joined with a heating mat placed between the sleeve and the pipe. The heating mat and the sleeve have a teeth structure that are locked into each other when put together so that the contact faces of the ends of the heating mat and the sleeve are made longer, this making certain that even if the pipe does not keep to its rated size a high-quality welded join may be produced.

This welding connector is clearly more complex than the welding connectors given in the said catalog.

In a known process for producing an electrical welding sleeve (see German Offenlegungsschrift specification No. 2,823,455) a special structure was to be placed on the sleeve body to keep one end of the wire in place, the structure gripping the wire while it was being let into the sleeve body. It will be seen that this process is complex.

The Spanish patent application No. 275,226 is with respect to an electrically heated welding fitting for the connection together of parts of thermoplastic material with the help of a ring-like body made of thermoplastic material as well and having a heating wire spiral coil on the inner face of the fitting to be used as a resistance heating element coated with thermoplastic material and having its ends joined with an electrical power supply. In this fitting the coating of each turn of the coil is firmly joined with the next turn thereto by welding so as to take the form of a compact outer layer because the coil is firmly joined with the ring-like body, this being because of some degree of inwardly acting contraction forces and because of latent residual contraction stress in the ring-like body. The effect of such stress is that when the said body is heated in the welding operation the play between the coil and the pipe-like parts is taken up and the pressure needed for welding is produced.

Although there are no printed accounts on the question, many attempts have been made in the prior art at designing a process for letting the heating element wire into the inner face of such a connector. In one method the resistance wire was coaled on a core that was then placed in a mold so that the sleeve body might be produced with the core therein. It will however be clear that this method is complex, a separate further working step in fact being needed to make the sleeve body.

In a further known process, of which there is no printed account, grooves are cut in the inner face of the sleeve into which the heating wire is then tucked. However in this case the wire is free and loose in the groove with an undesired spaces between it and the side of the groove.

SHORT OUTLINE OF THE INVENTION

One purpose of the present invention is that of designing an electrical welding connector in which the wire is let into the material of the connector in the best possible way without any oversize or undersize of the groove or the like in relation to the wire being overly great in amount.

A further purpose of the present invention is that of designing an electrical welding fitting in the form of a sleeve in the case of which there is little or no danger of the wire coming out of place (at the end of the sleeve) on pushing in the ends of the pipes to be joined into the sleeve or on welding itself.

In keeping with a still further purpose of the present invention the wire is to be strongly locked in place while all the same having a certain amount of space for making possible flow of the material, that has been melted at the time of welding.

For effecting these purposes and further purposes or objects that will become clear on reading this specification, the resistance heating wire is placed into a cut made in the face of the fitting, edges of the cut overlapping the wire like lips.

As part of a further development of the invention the connection is in the form of a sleeve with the wire placed in a coil within it, the parts of the coil near the ends of the sleeve having a small lead angle while in the middle thereof they have a greater lead or helix angle and near the middle of the sleeve there are buttons within for acting as stops for the two ends of pipes that are pushed into the sleeve to be joined together thereby.

In keeping with the process of the invention for making welding fittings, a cut is made in the face of the fitting in which the wire is to be placed and the cut is forced open so that the wire may be placed therein and the edges of the cut are forced overlappingly over the wire.

The tool for letting the wire into the face of the welding fitting may be in the form of a plowshare-like body.

Further details and useful effects of the present invention will be seen from the claims and the account now to be given of working examples thereof using the figures.

LIST OF THE VIEWS OF THE FIGURES

DETAILED ACCOUNT OF WORKING EXAMPLES OF THE INVENTION

Figure 1:
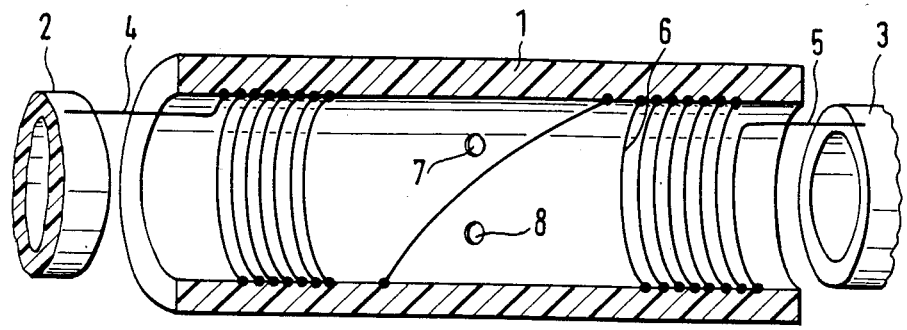
FIG. 1 is a section through a pipe-like synthetic resin part or fitting for joining together two synthetic resin pipes.

Turning firstly to FIG. 1 of the drawings, the reader will see a pipe-like or tubular synthetic resin fitting or connector 1, with which synthetic resin pipes 2 and 3 are to be joined.

A heating wire 6 is let into the face of the resin fitting 1 that is to be placed against the pipes 2 and 3 to be joined. The wire is placed along a coil or helix which towards the middle of the fitting has a large helix angle. The wire 6 has two connections 4 and 5 at its ends that are joined up with a power supply that is turned on once the two ends of the pipes 2 and 3 have been slipped into the fitting so that the wire is heated up. For this reason the resin material next to the wire 6 is heated as well so that resin of the fitting 1 and of the two ends of the pipes 2 and 3 is melted and the parts are welded together by fusion welding and a connection is produced between the pipe 2, the resin fitting 1 or connector and the pipe 3.

Buttons 7 and 8 may be so placed on the inside of the fitting 1 made of synthetic resin that the part of wire coil with a greater helix angles is trained between them. The buttons may take the place of a middle lip in the fitting for use as a stop for the ends of the pipe 2 and 3 as has so far been needed in such fittings in the prior art so that is was not possible for a wire to be trained through inside the fitting from its one end to the opposite end; in fact, it has so far only been possible for the wire to be made into two separate coils placed in the two ends of the fitting separately so that there were two wire ends at each end of the fitting or connector.

Figure 2:
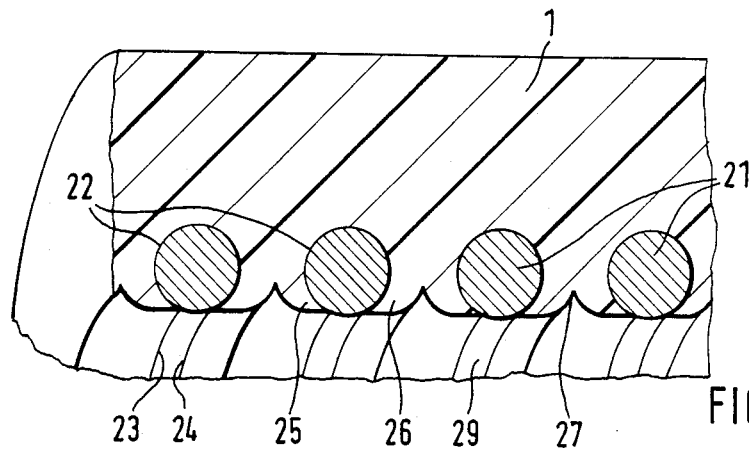
FIG. 2 is a view of part of the pipe-like fitting of figure on a larger scale.

FIG. 2 is a view with a section of part of the resin fitting in which the heating wire coil has a small helix angle in comparison with part in the middle of the fitting.

It will be seen that the heating wire 21 has been tucked into a furrow-like groove or cut 22 with cut edges 23 and 24 having lips 25 and 26 overlapping the heating wire 21, there being in this form of the invention a steep-sided groove 27 between the cuts and between the lips 25 and 26. This groove is present to let motion of the melted resin take place when welding is undertaken. Along a narrow opening 29 the heating wire 21 is uncovered so that it will come right up against the outer face of the pipe pushed into the fitting 1.

Figure 3:
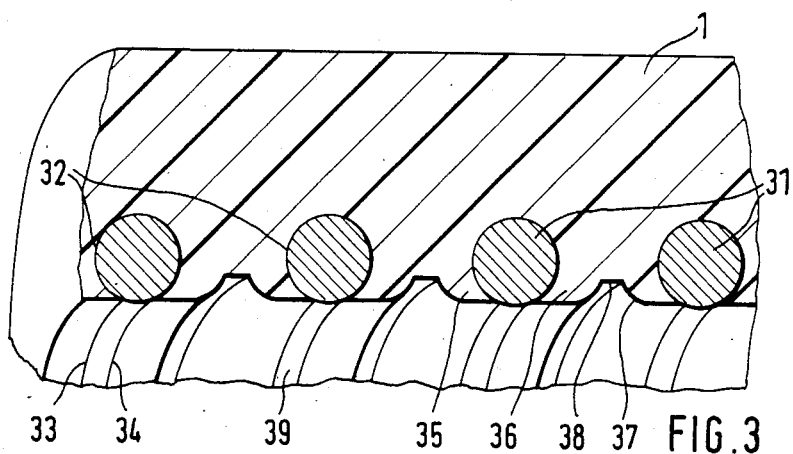
FIG. 3 is a view on the same lines as FIG. 2 of a somewhat changed form of fitting in keeping with the present invention.

In the further working example of the invention of FIG. 3 the heating wire 31 is placed in the cuts 32 and in this case as well the edges 33 and 34 of the cut 32 take the form of lips 35 and 35 overlapping the heating wire 31. The sides of the lips 35 and 36 furthest from the wire are on the two sides of a broad groove 38 as a space for flow of the melted resin at the time of welding. To put it differently, it may be said that the material of the pipe end and of the pipe-like fitting may be well mixed without any resin material being forced out at the end of the pipe-like fitting. In the working example of FIG. 3 as well part of the face of the heating wire 31 is uncovered at a narrow opening 39 between the edges 33 and 34 of the cut.

Figure 4:
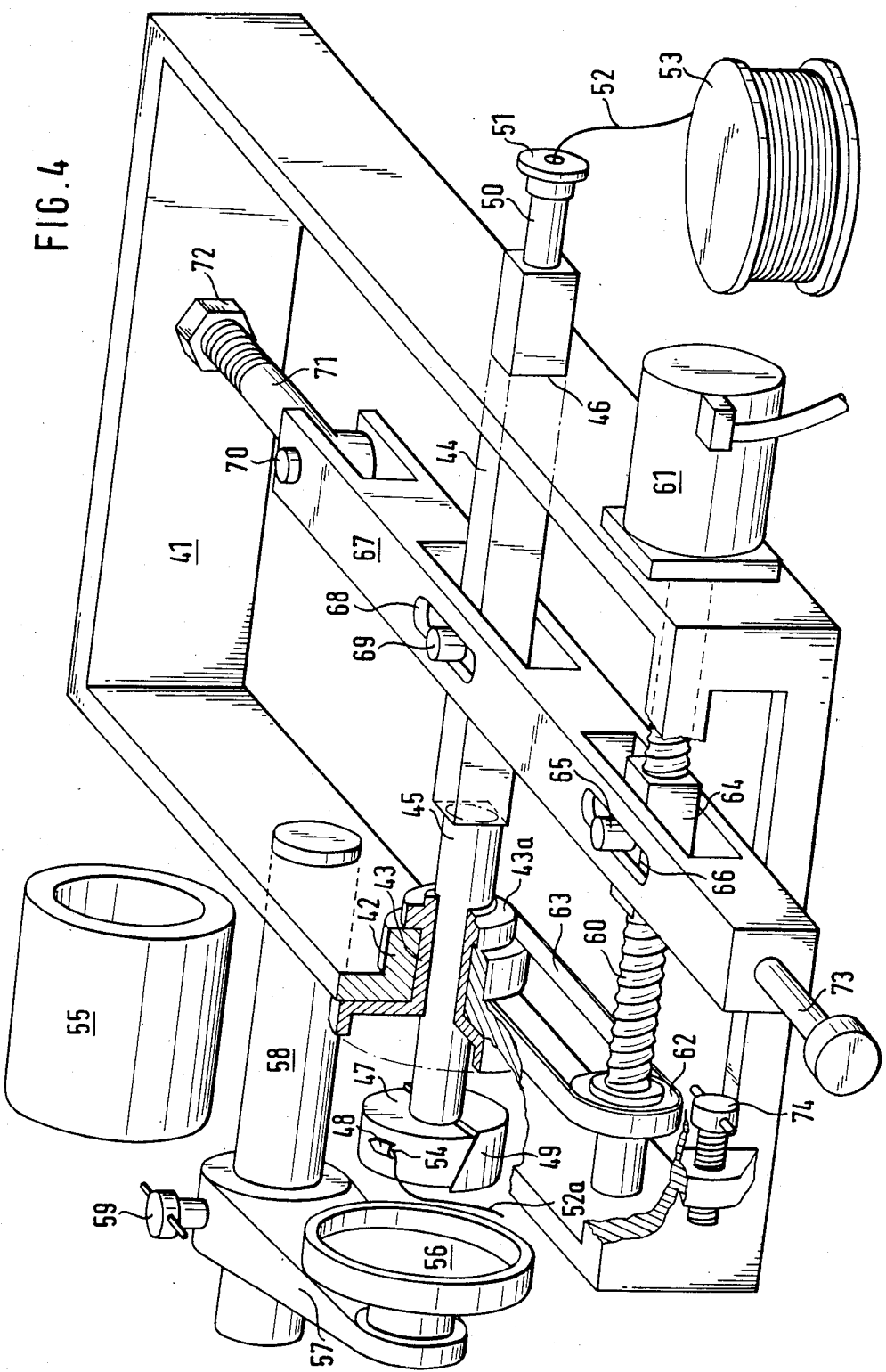
FIG. 4 is a diagrammatic perspective view of an apparatus for letting a heating element wire into the face of a pipe-like synthetic resin fitting in keeping with FIG. 1.

In FIG. 4 the reader will see a preferred form of apparatus for letting a heating wire into the active welding face of a pipe-like resin fitting, as for example a sleeve connector.

The apparatus has a box-like frame 41 having at 42 a bearing for a driver 43 that may be taken off if desired. A feed or driver rod 44 with an unround, and more specially square cross section is joined up with a shaft part 45 that is placed within the driver 43, the last-named being able to be freely turned on the shaft. At 46 the box-like frame has a square eye for the driver rod 44 for supporting the rod without said rod being able to be turned about its own axis.

The shaft part 45 is used as a support for a cutting head 47 that has a plowshare-like cutter 48. A pressing shoe 49 is placed on the cutting head for controlling the depth of cutting. The right hand end 51 of the driver rod is in the form of a button joined with the square-section part of the rod by a round part 50. The driver rod 44 is hollow so that the heating wire 52, coming from a reel 53 may be trained through it to the cutting head 47, from which it is trained radially outwards through an opening 54 at the back of the cutter 48, the outer end of the wire 52 being numbered 52a.

The sleeve 55 that is to have the wire 52 placed in cuts within it is kept in position by being placed between the driver 43 and an opposite support 56 that is able to be freely turned on a support arm 57. The arm 57 is supported on a rod 58 along which it may be moved and fixed in different positions of adjustment using a screw 59 for different lengths of sleeve 55. The driver 43 and the opposite support 56 for this reason take the form of a support system or unit for the sleeve 55.

The driver 43 is turned by a motor (61, see below) for turning the sleeve 55 whose other end is kept up by the opposite support 56 acted up by a spring that is not to be seen in the figure. The turning force acting on the sleeve 55 is great enough for a cut to be made in its inner face or surface by the cutter 48.

The part of the apparatus made up of the cutting head 47 and the shoe 49 has to be able to be moved along in the axial direction of the driver rod 44 so that a helical cut is made in the sleeve 55 and the wire 52 is let into the sleeve material along such a helical path, the form of the path or cut being fixed by a program.

This axial motion or feed is produced by a lead screw 60 turned by motor 61, this motor driving, by way of a pulley 62 keyed on the lead screw 60 and the belt 63, the driver 43 and for this reason the sleeve 55 as well. To this end the driver 43 has a pulley 43a fixed to it. It will be seen from this that the axial and turning motions of the sleeve 55 have a fixed relation to each other.

A lead nut 64 is placed on the lead screw 60 and has a driving pin 65 fitting into a slot 66 in a lever 67 which gives the desired step-down ratio between motion of the lead nut 64 and the motion of the cutting head in the axial direction. The lever 67 has a second slot 68 to take up a pin 69 on the driver rod 44 for producing a connection therebetween.

The far end of the lever 67 is turningly supported on a turnpin 70 at the end of a bolt 71 that may be changed in position after undoing a nut 72 and then fixed by the nut in relation to the box-like frame 41 again. The bolt 71 being adjustable, the step-down ratio between the lead screw 60 and the driver rod 44 may be changed (because the distances between the nut 64 and the pin 69 on the one hand and between the pin 69 and the turnpin 70 on the other may be changed in relation to each other). The lead nut 64 may be joined up with and unjoined from the lead screw 60 by using a handle 73. When unjoined from the screw 60 it may be freely moved therealong.

If the handle 73 is pushed in and the motor 61 is turned on the lead nut 64 will be moved along the lead screw 60, it so turning the lever 67 about the pin 70 at its far end that by way of the pin 69 the driver rod 44 will be moved along axially in keeping with the lead of the lead screw 60 and the ratio of the parts of the lever 67 between the pins 65 and 69 on the one hand and 69 and 70 on the other hand. Furthermore while the motor 61 is turned on the driver 43 will be turned so that the sleeve 55 is turned as well by way of the pulley keyed on the lead screw 60 and the belt 63, that is trained about the pully 43a on the driver 43.

The middle part of the lead screw 60 has a greater lead or pitch than at its ends to that the part of the part of the cut with the wire 52 therein is produced in the sleeve 55 with a large pitch as well, see FIG. 1. Then later the two buttons 7 and 8 are placed, for example by pressing, in the inner face of the sleeve for functioning as stops for the two ends of pipes 3 and 4 that are to be joined together. The apparatus further has an adjustable stop 74 for the motion of the lead nut 64 on the lead screw 60 so as to make changes in the motion of the nut on the screw 60. A stop of the same sort may furthermore be present to the other side of the driving lever 67 on the box-like frame 41.

Figure 5:
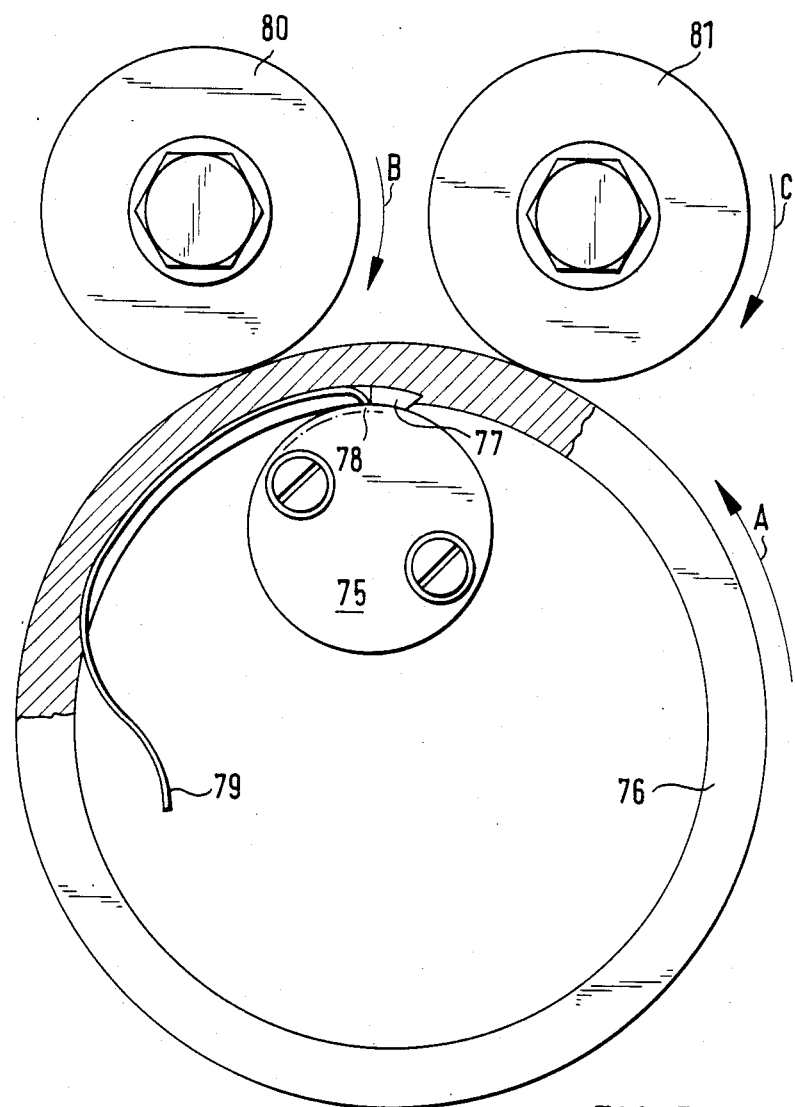
FIG. 5 is a view of a changed form of the cutting head with depth control rollers.

In FIG. 5 the reader will see a somewhat changed form of the cutting head. This form of head 75 is eccentric in relation to the resin fitting and as well has a plowshare-like cutter 77 for producing a groove or cut in the inner face of the pipe-like resin fitting 76. The heating wire 79 is trained outwards through a hole at the back of the cutter 77. When the resin fitting 76 is turned in the direction of arrow A a cut will be made in the inner face of the fitting 76. The wire 79 is let into the cut or furrow so produced and the cut shut up again The pressing rollers 80 and 81 are used for pressing the resin fitting 76 against the cutting head 75, the roller 81 being for seeing that the cutter 77 is forced to the desired depth into the inner face of the pipe-like resin fitting 76 whereas the roller 80 has the function of making it possible for the opened out to be shut again by the cutting head 75. The pressing rollers 80 and 81 do not have to be turned by a motor because the friction on the outer face of the resin fitting 76 is generally high enough for tuning them (in the directions B and C).

The system of FIG. 5 is more specially to be used for letting wire into the inner face of a resin sleeve that has a large diameter.

The teachings of the present invention are obviously not limited to letting heating wires into cylindrical surfaces and the surfaces may in fact be without radial or rotational symmetry. In such cases the cutting head with the plowshare-like cutter will be best controlled by a copying system working with a model of the fitting or the like into which the wire is to be let. Furthermore it will be clear that for making the cut in which the wire is placed, the amount of material (if any) machined away from the fitting is unimportant.

The claims defining the invention are as follows.

I claim:

1. Means for securing a cylindrical resin fitting to a resin body over which the fitting is at least partially telescopically positioned, said means comprising: a slit formed in the inside face of the fitting without removal of any of the resin material, an electrical resistance wire seated in said slit, the edges of said slit being displaced by the wire and forming lips partially overlapping the inner face of the wire to anchor the wire, a portion of the inner surface of the wire being exposed between the edges of the lips, said wire having a pair of ends projecting outwardly from said fitting for connection to a source of electrical energy.

2. The means for securing a cylindrical resin fitting as described in claim 1 wherein said slit and wire extend from one end of said fitting to the other and at least portions of both are helical.

3. The means described in claim 2 wherein said fitting is a sleeve and one of said helical portions of said slit and wire is adjacent each end of said sleeve.

4. The means described in claim 1 wherein the inside face of the fitting has a surface undulating in a direction lengthwise of the fitting with the inwardly exposed surface of the wire forming the apices of the undulations and the valleys of the undulations forming resin flow channels when the resin is heated to a flowable condition.

5. The means for connecting a pair of pipes of resin material, said means comprising a sleeve of resin material telescopically seated over and closely fitting about the adjacent ends of said pipes, a slit formed in the inside face of said sleeve without removal of any of the resin material, an electrical resistance wire seated in said slit, said slit and wire extending from one end of said sleeve to the other, said wire having an end projecting from each end of said sleeve for connection to a source of electrical energy, at least a portion of said slit and wire being helical, the edges of said slit being displaced by the wire and forming lips, said lips being caused by said wire and and forming lips, said lips being caused by said wire and partially overlapping the inner face of the wire to anchor the wire, a portion of the inner surface of the wire being exposed between the ends of the lips for heating the surfaces of said pipes to cause the resin of the pipes to flow together with the heated resin of the inside face of the sleeve for anchoring both pipes to said sleeve.

6. The means described in claim 5 wherein a helical portion of said slit and wire is located adjacent each of the ends of said sleeve.

7. The means described in claim 6 wherein the inside face of the fitting has a surface undulating in a direction lengthwise of the fitting with the inwardly exposed surface of the wire forming the apices of the undulations and the valleys of the undulations forming resin flow channels when the resin is heated to a flowable condition.

8. The means described in claim 7 wherein the inwardly exposed face of the wire contacts the outer face of the pipes prior to heating of the wire.

9. The means described in claim 5 wherein a rod-like stop projects radially into the interior of said sleeve midway between the ends of said sleeve for limiting inward telescopic movement of said pipes, said slit and wire passing to one side of said stop.

* * * * *

UNITED STATES PATENT AND TRADEMARK OFFICE
CERTIFICATE OF CORRECTION

PATENT NO. : 4,649,641
DATED : March 17, 1987
INVENTOR(S) : Wolfgang Sichler

It is certified that error appears in the above-identified patent and that said Letters Patent is hereby corrected as shown below:

Column 2, line 23:

"coaled" should be --coiled--

Column 4, line 7:

"lips 35 and 35" should be --lips 35 and 36--

Column 5, line 68:

"tuning" should be --turning--

Column 6, claim 5, line 54:

"wire and and forming lips, said lips being caused by said" should be deleted

Signed and Sealed this

Twenty-ninth Day of September, 1987

Attest:

DONALD J. QUIGG

Attesting Officer     Commissioner of Patents and Trademarks